April 2, 1935.  A. F. BOITEL  1,996,716
NUT LOCKING DEVICE
Filed Jan. 12, 1933  2 Sheets-Sheet 2

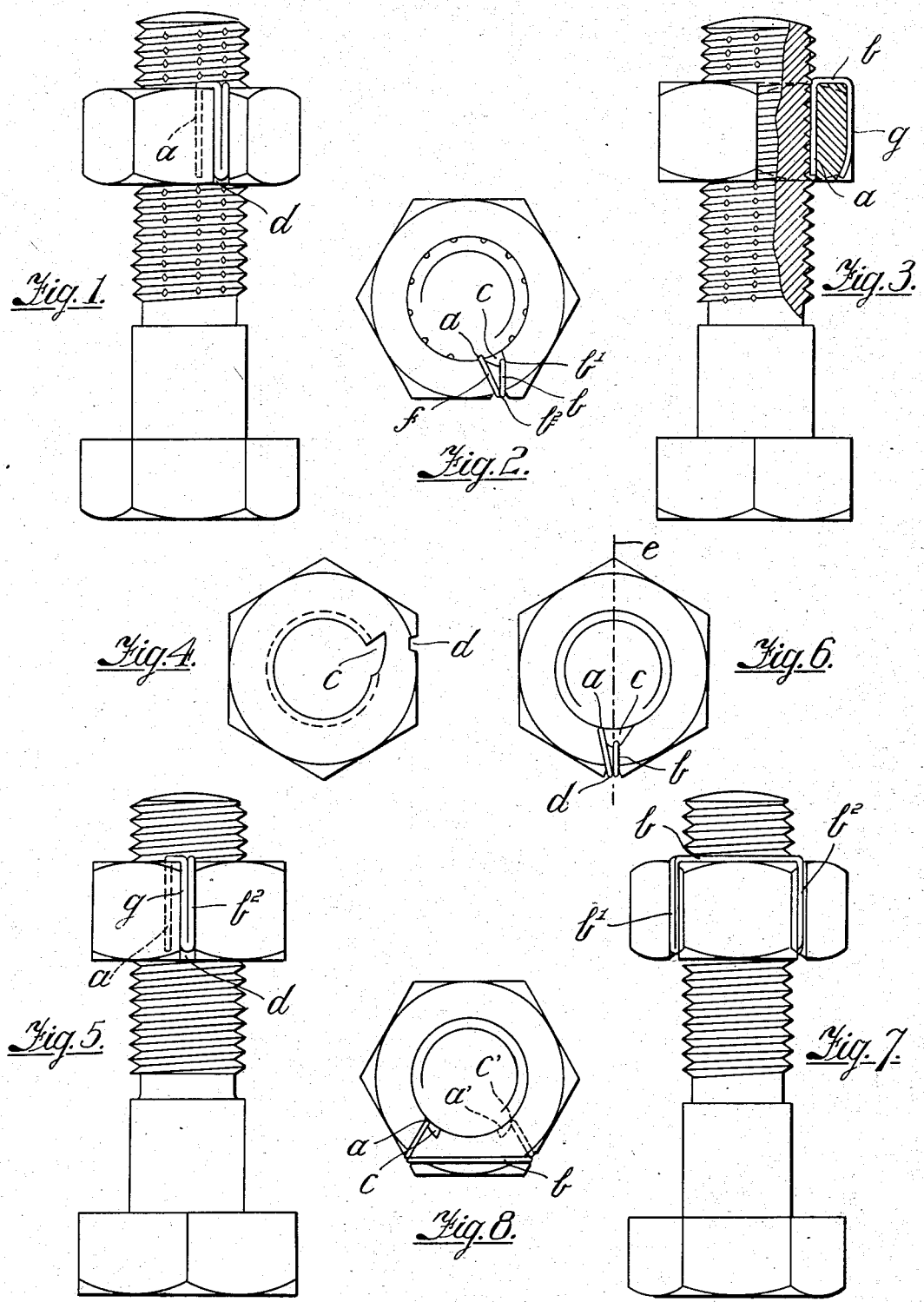

INVENTOR
Achille F. Boitel
By
ATTORNEY

UNITED STATES PATENT OFFICE 1,996,716

NUT LOCKING DEVICE

Achille Frederic Boitel, Berlin-Wilmersdorf, Germany, assignor to Walter Agahd, Berlin, Germany Application January 12, 1933, Serial No. 651,418
In Germany July 14, 1932

9 Claims. (Cl. 151—8)

This invention relates to nut locks of the kind in which the locking element consists of a pin running parallel to the axis of the nut to be locked and having a key action between the bolt and nut to prevent the nut screwing back on the bolt.

Nut locks of this type have the advantage that they are of very simple construction and are capable of being applied to all existing types of nuts and bolts, whilst offering in all cases security against unintentional loosening of the nut from the bolt even when same is submitted to very unfavourable stress i. e. subjected to constant shocks. A further advantage which distinguishes nut locks of this type is that they can remain on the nut when the latter is tightened and need not be removed, which would be a difficult operation and might lead to their being lost.

The known constructions of nut locks of this type have, however, a number of material defects. Firstly, they can only be set in position after mounting a nut on its bolt. Thus these nut locks could only be employed without difficulty when the nuts to be secured were located in easily accessible places, which is very often not the case, particularly in automobiles and aircraft in which such nut locks are largely used.

Furthermore, nut locks of the type referred to possessed the additional disadvantage that the locking means could only be rendered ineffective by the use of a special key or like tool. Attempts have been made to construct nut locks so that their elements could be removed from the nut whilst the latter was on the bolt, but special working or machining of the nut was necessary which was very expensive.

A further disadvantage of the known nut locks was that their securing means were formed at one side of the central transverse plane of the nut, so that the recess in the nut for receiving said securing means had also to be formed on one side of this transverse plane. Consequently the nut could only be set on the bolt from one side. This requires fairly close attention when setting the nuts on the bolts, particularly when, as is often the case these recesses are filled with rust and dirt and are not easy to see.

The object of the present invention is to provide an improved nut lock, of the type referred to which whilst retaining all the advantages of the known devices is so constructed as to avoid the disadvantages above referred to and provide a locking device wherein a wedging action is set up to lock the nut against unintentional removal from the bolt.

According to the invention a nut locking device is provided which includes a locking element or elements adapted to engage between a bolt and a nut, a shank portion resiliently engaging the nut or the bolt to hold the locking element or elements in operative position and a bridge piece connecting the locking and shank elements and extending across the upper or lower face of the nut or across the head of the bolt.

The invention also consists in a nut locking device comprising a U-shaped element adapted to be mounted straddle-wise across the nut or the head of the bolt and including a locking pin extending parallel to the axis of the nut and engaging between the bolt and the nut with a key action.

The device can be so arranged that the locking member can be reversed as to position on the nut to allow rotation in one direction only whilst permitting reversal of the position of the nut.

The invention can be employed either with bolts of normal construction or with bolts having longitudinal grooves. In the latter case the locking pin when rotated enters into one of the grooves, so that the resistance of the nut to unscrewing is set up not merely by frictional contact but also by formal contact. When such longitudinal grooves are present, the wire of which the locking device is composed may be round in section.

Reference will now be made to the accompanying drawings, in which various embodiments of the invention are illustrated by way of example and in which:—

Figs. 1 and 2 are views in elevation and plan, respectively, of a nut provided with the locking device according to the invention in position on a bolt.

Fig. 3 is a further elevation partly in section of the assembly shown in Fig. 1.

Fig. 4 is a plan of the nut alone.

Figure 15:
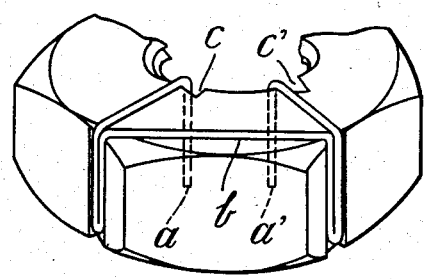
Figure 16:
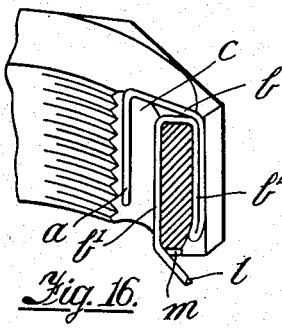
Figure 17:
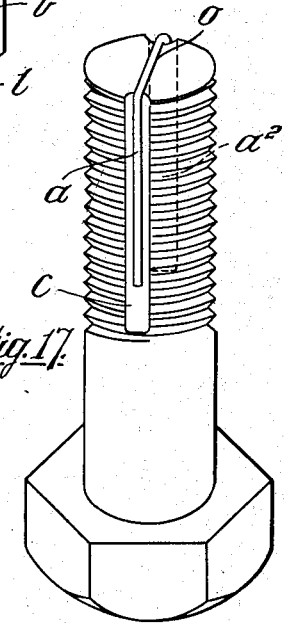
Figure 18:
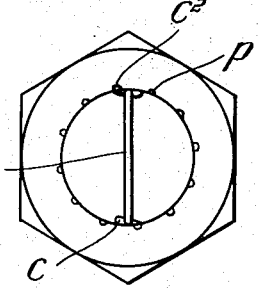
Figure 19:
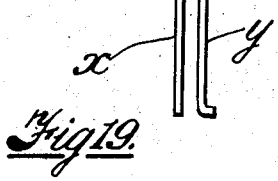

Figs. 5 and 6 are elevation and plan views, respectively of a further embodiment of the nut lock according to the invention, Figs. 7 and 8 are elevation and plan views of a third form of the invention, Figs. 9–16 illustrate in perspective view various other constructions of the nut lock according to the invention, Figs. 17 and 18 are views in perspective and plan, respectively, of an arrangement wherein the locking element is carried by the bolt, and Fig. 19 is a perspective view of a modified form of locking pin.

In the construction according to Figs. 1 to 4, the nut lock consists of the locking pin $a$ and the U-shaped bracket $b$ attached thereto. The two parts are formed from a single piece of wire, and are, therefore, easy and cheap to manufacture.

The nut in which the locking pin $a$ is to be inserted is provided on its inner periphery with a recess $c$ for receiving and permitting attaching and detaching movement of the same. In this recess the locking pin $a$ and the inner shank $b^1$ of the bracket $b$ are located in such manner as to lie axially parallel to the nut, the device being so positioned that the pin $a$ lies at the inner end of the recess and thus comes into contact with the thread of the bolt, whilst the shank $b^1$ lies at the outer end of the recess.

The bracket $b$ is set straddle-wise on the nut so that its outer shank $b^2$ is on the outside of the nut. As the two shanks tend to spring together they are prized open when set on the nut, being thereby tensioned which holds them securely on the nut. Consequently the locking device may be set in position on the nut without the latter having first to be screwed onto the bolt.

For receiving the outer shank $b^2$ of the bracket a groove $d$ is preferably provided in the outer surface of the nut so that this shank shall not constitute an external projection and prevent the use of a spanner. It is not necessary, however, to provide recesses on both faces of the nut for receiving parts of the locking device.

The manner in which the lock nut operates is known per se. When the nut is tightened, the locking pin $a$ positions itself between the bolt and the nut with a key action and renders back-screwing of the nut impossible although it permits forward screwing of the nut from any position. The bolt can, as illustrated in Figs. 1, 2 and 3 be provided with longitudinal grooves, but these are not necessary and can therefore be omitted without departing from the invention.

If the recess $c$ in the bore of the nut is made in the form of an isosceles triangle in whose apex the inner shank $b^1$ of the U-bracket positions itself as in Figs. 5 and 6, the locking device can be inserted into the nut from either face, the locking pin $a$ then taking up position in one or other of the base angles of the triangle according to the side from which it is inserted into the nut.

The recess $c$ in this form is symmetrical to the radial plane $e$. If the locking pin were inserted from the underside of the nut in Fig. 5 the pin $a$ in Fig. 6 would position itself in the right-hand corner instead of in the left-hand corner of the recess $c$.

Figs. 7 and 8 illustrate a construction of the nut-lock in which the bracket $b$ is not arranged radially to the axis of the bolt as in the previously described constructions, but runs substantially tangentially thereto, its two shanks $b^1$ and $b^2$ lying on the outside of the nut. The pin $a$, however, is again located at the tip of the groove $c$ as required in order to obtain a locking effect. These two figures also illustrate the possibility of providing a single bracket $b$ with locking pins not only at one but at both its ends, as illustrated in broken lines in Fig. 8. For receiving the second locking pin $a^1$ a second groove $c^1$ is provided in the nut. In the construction shown, the tip of the groove $c^1$ in which the locking pin positions itself is directed oppositely to that of the groove $c$ in comparison with the direction of rotation of the nut, so that the two pins $a$ and $a^1$ prevent rotation of the nut in both directions. It is obvious, however, that the two grooves may be given the same direction in relation to the rotation of the nut, in which case the pin $a^1$ will act as a double lock for the nut and in the same direction as the pin $a$.

Figure 9:
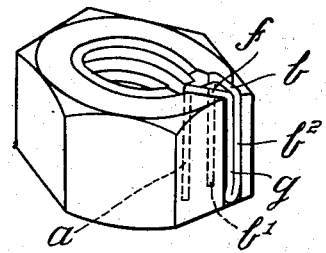

Fig. 9 is a perspective illustration of the construction of the nut lock already illustrated in Figs. 1–3 in combination with the nut and bolt. The pin $a$ attaches to the bracket $b$ by means of a stay or bridge $f$ and a shank $g$ lying externally of the nut, these two members forming with the locking pin a second bracket.

Figure 10:
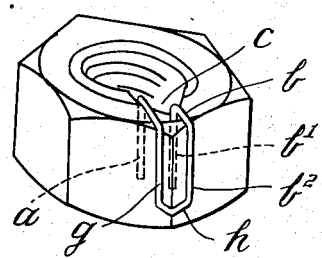

Fig. 10 illustrates a construction which is similar to that shown in Fig. 9 insofar as the pin $a$ is connected to the securing bracket $b$ by means of a separate bracket. In this case, however, the two externally located shanks $g$ and $b^2$ are not close together but are arranged a certain distance apart and are connected by a short stay $h$. This arrangement enables the nut lock to be mounted on one of the outer corners or angles of the nut. The groove $c$ is symmetrical to the radial plane passing through its bottom, so that the locking device can be inserted from either side of the nut. This purpose is also served by the described arrangement of the shanks $g$ and $b^2$.

Figure 11:
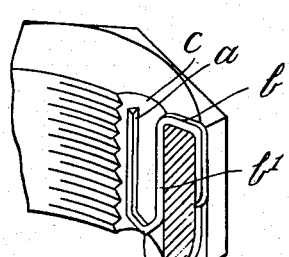

The construction according to Fig. 11 differs from the preceding ones insofar as the locking pin $a$ is connected directly to the inner shank $b^1$ of the U-bracket by means of a short stay $i$ which is also located in the groove $c$. This construction is particularly useful for large nuts.

Figure 12:
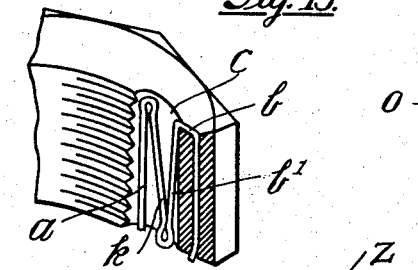

In the construction according to Fig. 12 the pin $a$ is connected to the inner shank $b^1$ of the bracket by an oblique shank $k$ so as to give a greater resilient effect. This shank $k$ is also located in the groove $c$.

Figure 13:
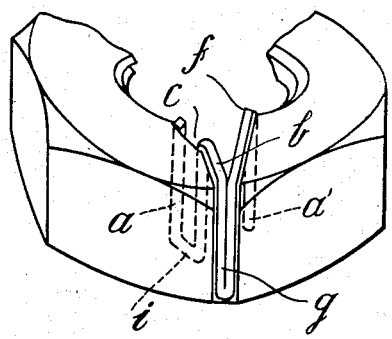

The construction according to Fig. 13 is similar to that shown in Fig. 7 insofar as one and the same U-bracket $b$ is provided with two locking pins $a$ and $a^1$. In this construction, however, the bracket runs radially to the axis of the bolt. The pin $a$ illustrated on the left in Fig. 13 is attached to the U-bracket $b$ by a short stay $i$ as in Fig. 11 whilst the right hand pin $a^1$ is connected to the said bracket $b$ by means of a second bracket composed of a stay or bridge $f$ and shank $g$ as in Fig. 9. The two pins $a$ and $a^1$ are located in a common groove $c$ and thus act on the nut in opposed directions.

Figure 14:
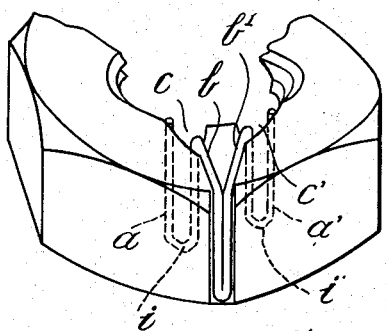

The construction according to Fig. 14 also has two locking pins $a$ and $a^1$ connected to the U-bracket by a short stay $i$ as in Fig. 11. In this construction, however, not one but two U-brackets $b$ and $b^1$ are provided so that the whole device is symmetrical in construction. Separate grooves $c$ and $c^1$ are provided in the nut for receiving the two pins $a$ and $a^1$.

The construction according to Fig. 15 also has two locking pins $a$ and $a^1$. The bracket $b$ runs tangentially to the axis of the bolt, so that the lock corresponds substantially to the construction shown in Figs. 7 and 8. In this case, however the two grooves $c$ and $c^1$ are similarly directed, so that the two pins $a$ and $a^1$ act on the nut in the same direction.

The construction according to Fig. 16 is provided with a downwardly projecting extension $l$ on one shank $b^1$ of the bracket. When the nut applies itself against its base, this extension by engagement with a part secured by the bolt, is pressed up into a groove $m$ provided therefor in the under face of the nut, thus closing the bracket $b$ on the fourth side to form a ring, so that the device cannot be removed from the nut without first unscrewing the latter, which may for instance be effected by means of a depressing pin inserted from above into the groove $c$.

In the constructions shown in Figs. 3, 9, 11, and 12 the lower end of the two externally located shanks $g$ and $b^2$ and the groove for receiving same are curved inwardly somewhat so as to form a kind of barb which prevents the device coming loose from the nut even under the severest shocks.

In the construction illustrated in Figs. 17 and 18, the locking element is also of U-shape and comprises two locking pins $a$ and $a^2$ connected by a bridge piece $o$ which lies across the head of the bolt, the two locking members entering recesses $c$ and $c^2$ formed longitudinally at diametrically opposed points on the bolt. These recesses may be shaped as shown to impart a locking effect against rotation of the nut in one direction, or they may be so shaped as to lock the nut against rotation in both directions. This arrangement may be modified by utilizing only one recess in the side of the bolt and by inserting the pin $a^2$ in a recess in the head of the bolt. In either form the recess $c$ or recesses $c$ and $c^2$ may co-operate with internal grooves $p$ in the nut.

I claim:—

1. A nut lock comprising a U-shaped bracket adapted to be mounted straddle-wise across a nut, a locking pin carried by the bracket, said nut being grooved to receive the locking pin, and the inner shank of the U-bracket being formed symmetrically to the radial plane passing through the inner shank to enable the nut lock to be inserted through either face of the nut.

2. A nut lock comprising a U-shaped bracket adapted to be mounted straddle-wise across the nut, the nut having a groove, one shank of the U-bracket being disposed in said groove, and the groove and shank being inclined at the end towards the axis of the nut to form a barb for preventing the nut lock working loose from the nut.

3. A nut lock comprising a U-shaped bracket mounted straddle-wise across the nut, one shank of the U-bracket having an extension running obliquely to the longitudinal axis of the nut and bent over towards the other shank of the bracket to close the bracket to form a rectangle substantially enclosing the nut on all sides.

4. A nut locking device having in combination with a nut recessed internally and externally, a detachable resilient locking device comprising an inner and outer portion, respectively, occupying said recesses and joined by a bridge, a longitudinally grooved bolt on which said nut is threaded, and means for reversing said locking member on said nut to allow rotation in one direction only whilst permitting reversal of the position of the nut.

5. A nut locking device comprising in combination with a nut and bolt in threaded engagement, a U-shaped bracket mounted straddle-wise across the nut and including a locking pin extending parallel to the axis of the nut and engageable between the bolt and the nut with a key action, a shank to which the locking pin is connected, a shank connecting the first shank to the bracket, and said nut having a groove in which said shanks are disposed.

6. A nut locking device comprising in combination with a nut and bolt in screw threaded engagement, a U-shaped bracket mounted straddle-wise across the nut and including a locking pin extending parallel to the axis of the nut and engageable between the bolt and the nut with a key action, a shank on the bracket externally of the nut to which the locking pin is connected, and a second bracket to which the shank is connected.

7. A nut locking device comprising in combination with a nut having a longitudinal recess in its bore and a bolt in threaded engagement with the nut, a U-shaped bracket mounted straddle-wise across the nut, a locking pin connected to each of the shanks of the bracket, said pins being disposed in said recess parallel to the axis of the nut and engageable between the bolt and the nut with a key action.

8. A nut locking device comprising in combination with a nut having spaced longitudinal recesses in its bore and a bolt in threaded engagement with the nut, a U-shaped bracket mounted straddle-wise across the nut, a locking pin connected to the shanks of the bracket and disposed in said recesses parallel to the axis of the nut and engageable between the bolt and the nut with a key action.

9. A nut lock comprising a U-shaped bracket adapted to be mounted straddle-wise across a nut, a locking pin carried by the bracket, said nut being grooved to receive the locking pin and the inner shank of the U-bracket, and being formed symmetrically to the radial plane passing through the inner shank to enable the nut lock to be inserted through either face of the nut.

ACHILLE FREDERIC BOITEL.